United States Patent
Joos et al.

(10) Patent No.: US 6,951,205 B2
(45) Date of Patent: Oct. 4, 2005

(54) METHOD AND ARRANGEMENT FOR CORRECTING A FUEL QUANTITY WHICH IS SUPPLIED TO AN INTERNAL COMBUSTION ENGINE

(75) Inventors: Klaus Joos, Walheim (DE); Karsten Kroepke, Ludwigsburg (DE); Ruediger Weiss, Moetzingen (DE); Martin Schlemmer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/431,440

(22) Filed: May 8, 2003

(65) Prior Publication Data

US 2003/0213476 A1 Nov. 20, 2003

(30) Foreign Application Priority Data

May 8, 2002 (DE) .......................... 102 21 337

(51) Int. Cl.$^7$ ............................... F02D 41/06
(52) U.S. Cl. .................... 123/491; 123/179.16
(58) Field of Search ....................... 123/179.16, 491, 123/685, 686

(56) References Cited

U.S. PATENT DOCUMENTS

| | | | | |
|---|---|---|---|---|
| 5,074,271 A | * | 12/1991 | Suzuki et al. | 123/491 |
| 5,394,857 A | * | 3/1995 | Yamakawa | 123/686 |
| 5,881,697 A | | 3/1999 | Schott et al. | 123/491 |
| 5,979,413 A | * | 11/1999 | Ohnuma et al. | 123/491 |
| 6,655,359 B2 | * | 12/2003 | Hasegawa et al. | 123/491 |

* cited by examiner

*Primary Examiner*—Tony M. Argenbright
(74) *Attorney, Agent, or Firm*—Walter Ottesen

(57) ABSTRACT

The invention relates to a method and an arrangement for correcting a fuel quantity which is supplied to an internal combustion engine. The correction is carried out in dependence upon a first corrective value for a start phase of the engine and a second corrective value for a restart of the engine. In this way, a precise fuel precontrol can be carried out.

13 Claims, 1 Drawing Sheet

METHOD AND ARRANGEMENT FOR CORRECTING A FUEL QUANTITY WHICH IS SUPPLIED TO AN INTERNAL COMBUSTION ENGINE

BACKGROUND OF THE INVENTION

U.S. Pat. No. 5,881,697 discloses a method for adjusting an additional fuel quantity which is supplied to an internal combustion engine during warm-up operation in addition to a basic quantity designed for the operation of an operationally-warm engine.

SUMMARY OF THE INVENTION

Compared to the above, the method and arrangement according to the invention afford the advantage that the correction is carried out in dependence upon a first corrective value for a start phase of the engine and a second corrective value for a restart phase of the engine. In this way, a correction of the fuel quantity, which is supplied to the engine, can be especially precisely realized for different fuel qualities because the fuel quality becomes more noticeable in the restart phase than in the start phase. This is so because, in the start phase, fuel, which is vaporized, is mostly still present from previous starts which at least augments the start capability. Furthermore, a longest possible monitoring time span for detecting fuel quality is used by considering the start phase as well as the restart phase of the engine for the determination of the correction of the fuel quantity. This monitoring time span is, in any event, longer than when monitoring, for example, only the start phase of the engine for forming the correction of the fuel quantity. By considering the start phase as well as the restart phase for the correction of the fuel quantity, the method of the invention can be especially advantageously applied in the start phase and in the restart phase of the engine.

It is especially advantageous that the first corrective value is determined in dependence upon the rpm runup in the start phase. The rpm runup in the start phase is suitable especially for the determination of the first corrective value because the fuel quality operates directly on the rpm runup in the start phase.

A further advantage is that the second corrective value is determined in dependence upon the rough running of the engine in the restart phase. This quantity, as also the rpm runup, is simple to determine and is directly influenced by the fuel quality in the restart phase.

It is especially advantageous that a third corrective quantity is formed from the sum of the first corrective value and the second corrective value for correcting the fuel quantity. The first corrective value and the second corrective value are included weighted in the sum. In this way, the different effect of the fuel quality on the start phase and on the restart phase is considered. As described, the fuel quality operates more clearly in the restart phase than in the start phase itself because mostly still vaporized fuel from previous starts is present in the start phase which supports the starting capability. Alternatively, the third corrective value can also be formed from a product of the first corrective value and the second corrective value. The first corrective value and the second corrective value can likewise be included weighted in the product.

It is especially advantageous when the third corrective value is transferred weighted to at least a further engine start temperature. In this way, corrective values for the fuel quantity can be formed or adapted rapidly and simply with a minimum measuring complexity for a plurality of engine start temperatures.

A simple correction of the fuel quantity can be achieved via a correction of the injection time.

It is especially advantageous when the correction of the fuel quantity is carried out in at least a dynamic operating phase of the engine, especially the start phase, the restart phase or a wall film compensation. In this way, a precontrol can be realized in these dynamic operating phases so that the fuel quantity can be especially effectively corrected in dependence upon the fuel quality especially in these dynamic operating phases rapidly and ahead of the action of a lambda control.

A further advantage is that the correction of the fuel quantity in different dynamic operating phases is weighted differently. In this way, the correction of the fuel quantity can be specifically adapted to the particular dynamic operating phase. Especially in the restart phase, the fuel quality acts with greater intensity than in the start phase so that the correction of the fuel quantity in the restart phase must be, as a rule, more weighted than in the start phase.

A further advantage is that an additional correction of the fuel quantity is carried out in a restart phase when the correction of the fuel quantity exceeds a pregiven value or when the rough running in the restart phase exceeds a pregiven value. In this way, a corrective value for the fuel quantity can be adapted to changing conditions in the actual start and restart phase and an air/fuel mixture, which is too lean or too rich, can be avoided in the start and restart phases. This corrective value for the fuel quantity was determined from a previous start phase and restart phase of the engine.

BRIEF DESCRIPTION OF THE DRAWINGS

The invention will now be described with reference to the single figure (FIG. 1) of the drawing which shows a combined block circuit diagram and sequence diagram for the method and arrangement of the invention.

DESCRIPTION OF THE PREFERRED EMBODIMENTS OF THE INVENTION

Figure 1:
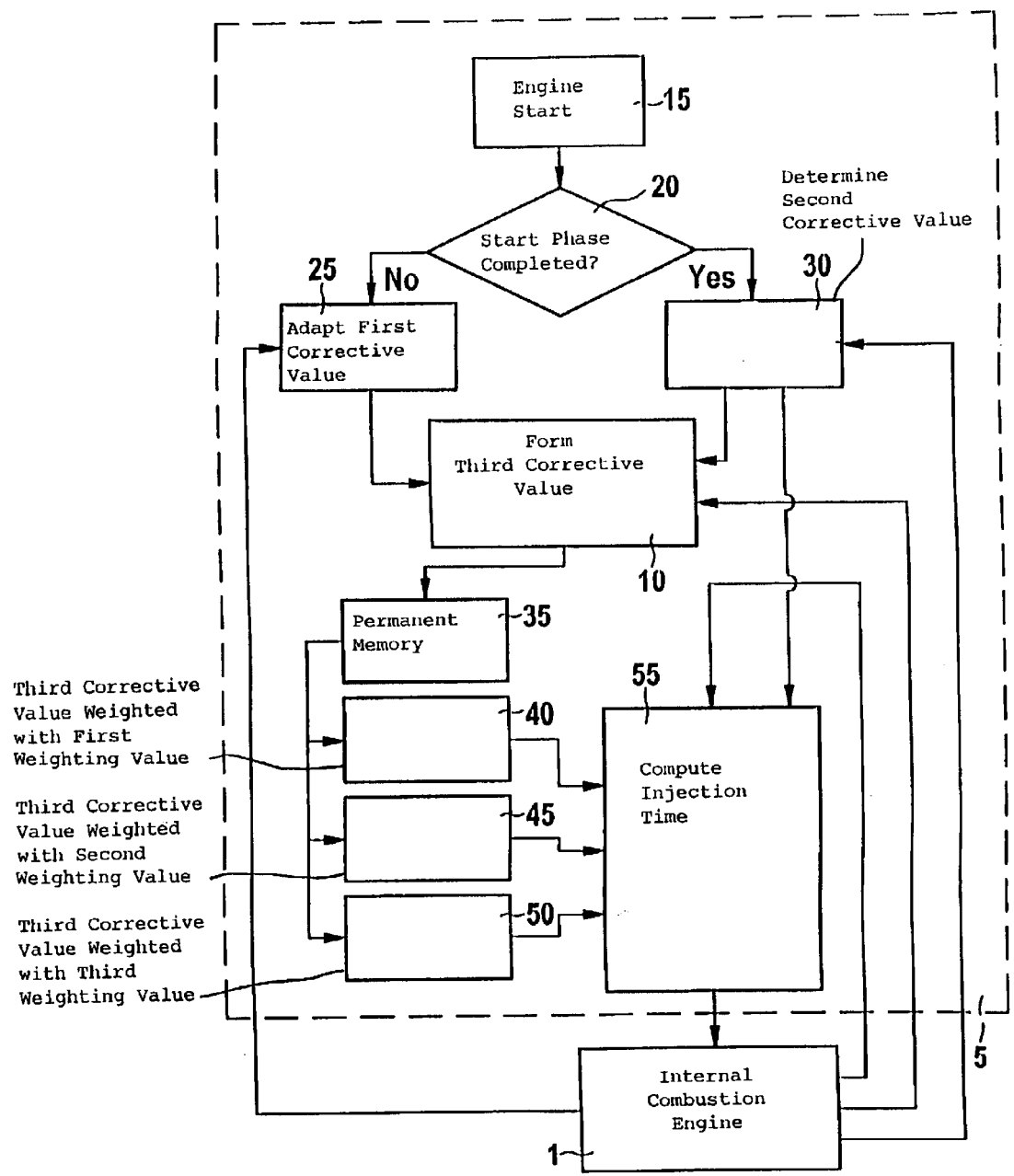

In FIG. 1, reference numeral 1 identifies an internal combustion engine, for example, of a motor vehicle. The engine 1 is driven by an arrangement 5 which is identified in the following also as a control unit. The control unit 5 includes a memory and a processor for executing a computer program whose sequence is shown in FIG. 1. The blocks of the control unit 5 shown in FIG. 1 can be realized as software or in the form of hardware components. FIG. 1 shows software as well as hardware elements for the control unit 5.

Fuel metering plays a decisive role for the exhaust-gas performance especially during the start of internal combustion engines configured as spark-ignition engines. Decisive for the ignitability of the air/fuel mixture is, however, not only the injected fuel mass but primarily the portion of the vaporized components thereof. In some countries, such as the United States of America, there are greatly varying standards for fuel and a still greater number of various compositions of fuel are in reality present. These possible variations of the fuel quality must be covered by the engine management, that is, by the control unit 5, in order to be able to ensure for the driver a high availability of the engine 1 and therefore, for example, of the motor vehicle.

The computer program, which is stored in the control unit 5, starts at a program point 15 and causes the engine 1 to undergo an engine start. The internal combustion engine 1 is thereby brought into a first dynamic operating phase, the so-called start phase. The engine provides information as to the rpm of the engine 1 to the control unit 5. Based upon the rpm information, the control unit 5 checks at a next program point 20 as to whether the start phase and the start adaptation connected therewith is completed. If this is the case, then there is a branching to a program point 30; otherwise, there is a branching to a program point 25. The actual start adaptation takes place at program point 25. The speed of the rate of change during the rpm runup in the start phase is utilized for an evaluation of the fuel quality. The evaluation of the fuel quality is characterized by a first corrective value for the start phase which is used to correct the fuel quantity which is supplied to the engine 1. Initially, the first corrective value is adapted to a certified fuel. Fuels having a poorer fuel quality than the certified fuel (that is, with less easily-boiling components) lead to a poorer start performance which becomes manifest by delayed rpm runups in the start phase. These delayed rpm runups are detected in the start adaptation at program point 25 from the transmitted rpm information and the first corrective value is correspondingly adapted so that a larger fuel quantity can be supplied to the engine 1 than with the presence of the certified fuel. The correction of the fuel quantity can, for example, be realized via a correction of the injection time. This realization should be viewed in the following as exemplary. The first corrective value is supplied to means 10 which determine a total corrective value for the metering of fuel quantity to the engine 1 in the form of a third corrective value.

The start phase or adaptation phase is detected as completed at program point 20 when the control unit 5 detects, by means of the rpm information, an engine rpm of the engine 1, which is greater than a first pregiven value, for example, 600 rpm. A second dynamic operating phase directly follows the first dynamic operating phase and is characterized also as a restart phase. A restart stabilization for the restart phase of the engine 1 is carried out at program point 30. For this purpose, the control unit 5 is supplied information as to the rough running of the engine by the engine 1 and this rough running is determined based on the rpm fluctuations of the engine 1. If the rough running exceeds a pregiven value (which, for example, is formed by the standard deviation from earlier measurements of the rough running and corresponds to the desired rough running value in the restart phase), then this is detected at program point 30. At program point 30, a second corrective value for the restart phase of the engine 1 is determined from the difference between the actual rough running value and the pregiven value for the rough running. The second corrective value is likewise applied for correcting the fuel quantity which is to be supplied to the engine 1. This correction is likewise carried out via a correction of the injection time. In this way, the first corrective value and the second corrective value each represent a corrective value for the injection time. The second corrective value is also supplied to the means 10.

The means 10 form the third corrective value from the first corrective value and the second corrective value. The third corrective value as a total corrective value corrects the fuel quantity to be supplied to the engine 1. This takes place, as described, via the correction of the injection time so that this third corrective value is a corrective value for the injection time. The third corrective value for the injection time is therefore a total corrective value which considers the effects of the fuel quality in the start phase as well as in the restart phase. This is especially of significance because it has been shown that the fuel quality is not only effective in the start phase but primarily also in the restart phase. Therefore, the fuel quality can be considered more accurately in the correction of the fuel quantity to be supplied to the engine 1. The fuel quality operates differently on the start phase and the restart phase. For this reason, the first corrective value and the second corrective value are each weighted differently in the sum or in the product for forming the third corrective value. It has been shown that the fuel quality is often more effective in the restart phase than in the start phase itself because, in the start phase, vaporized fuel from the previous starts is mostly still present which augments at least the startability.

The third corrective value as a fuel quality characteristic value is determined via a weighting of the first and second corrective factors. The weighting factors used for this purpose define a statement as to the quality of the adaptation of each of the first and second corrective factors. Features of the quality of the two individual adaptations can, inter alia, be: the adaptation duration, the reaching of adaptation limits and a possible adaptation interruption. Furthermore, the adaptations can be subjected to a plausibility check. The results of such a plausibility check can be an important supplement to the determination of the weighting factors.

Furthermore, the engine temperature during engine start is supplied by the engine 1 to the means 10. The computed third corrective value is therefore stored for the engine start temperature, which is present at engine start, in a permanent memory 35 of the control unit 5. The third corrective value therefore applies for this engine start temperature. In addition to the described adaptation of the third corrective value to the corresponding engine start temperature, a weighted transfer of the third corrective value to other engine start temperatures or engine start temperature ranges can be carried out by means of a characteristic line so that for these additional engine start temperatures or engine start temperature ranges, no actual adaptation and no actual measurement operations are required.

The third corrective value therefore results as a fuel quality characteristic value from different criteria, that is, while considering the start phase and the restart phase, the third corrective value therefore defines the total needed fuel enrichment with respect to the adaptation to the certified fuel.

In block 55 of the control unit 5, the required injection time is computed from the charge of the engine 1. The charge can, for example, be determined via a hot wire air mass throughflow sensor. From this, the fuel mass can be computed in block 55 and this fuel mass must be supplied to the engine 1 in steady-state operation or in warm-up operation in order to be able to realize a pregiven air/fuel mixture when a certified fuel is present. From the fuel mass which is to be supplied to the engine 1, the block 55 can compute the injection time which is needed in order to supply this fuel mass to the engine 1. A different fuel quality is compensated by the lambda control in the steady-state condition or in the warm operation of the engine 1. In dynamic operating phases of the engine 1, the lambda control is, however, either not active or not sufficiently rapid. For this reason, a precontrol is realized with the aid of the third corrective value and this precontrol early adapts the required injection time to the different fuel qualities. According to FIG. 1, the correction of the fuel quantity, which is to be supplied to the engine 1, is provided in three dynamic operating phases of the engine. The third corrective value can be weighted differently in different dynamic operating phases. In block 40, the third corrective value for a start enrichment of the fuel quantity, which is to be supplied to the engine in the start phase, is weighted with a first weighting factor. In a block 45, the third corrective value for a restart enrichment or warm running enrichment of the fuel quantity, which is to be supplied to the engine 1 in the restart phase, is weighted with a second weighting factor. In block 50, the third corrective value for a transition compensation or wall film compensation is weighted with a third weighting factor for correcting the fuel quantity to be supplied to the engine 1 during an acceleration or deceleration operation. For example, the first weighting factor can be selected less than the second weighting factor in order to make clear the greater influence of the fuel quality on the restart phase. It can, however, also be provided that the third corrective value is weighted the same for the different dynamic operating phases.

It can also be provided that no weighting of the third corrective value takes place for one or several of the dynamic operating phases.

With respect to transition compensation or wall film compensation, it can be said that especially for cold temperatures and, additionally, in dependence upon ambient pressure and engine rpm, a fuel deposit or wall film formation of the fuel in the intake manifold and/or in the combustion chamber of the engine 1 can take place during acceleration or deceleration of the engine 1. In this way, the air/fuel mixture is slightly leaned so that the injection time can be increased by the third corrective factor in order to compensate this leaning.

The internal combustion engine 1 is triggered to adjust the computed injection time in all of the above-described cases or operating phases by the block 55 of the control unit 5 so that the required fuel quantity can be metered to the engine 1.

The injection time, which is computed by block 55 in dependence upon the charge, is based, as described, on the certified fuel. The fuel, which is in reality to be compensated, exhibits a poorer quality than the quality of the certified fuel. The third corrective value is weighted, as required, in dependence upon the particular dynamic operating phase and is multiplied by the injection time computed in block 55 proceeding from the certified fuel in order to compute a resulting injection time which is ultimately outputted to the engine 1 as an input. For a used fuel having a poorer quality than the certified fuel, the third corrective value, which is weighted as required for the corresponding dynamic operating phase, is greater than one in order to achieve an increase of the injection time, which is computed proceeding from the certified fuel, and therefore to achieve an enrichment of the air/fuel mixture and, in this way, to compensate for the poorer quality of the fuel used.

The third corrective value is used weighted or unweighted for the correction of the injection time computed for the certified fuel. As a rule, this third corrective value does not become effective in that start or restart phase of the engine 1 where it was determined, rather, this third value becomes effective only in a subsequent start or restart phase. However, the third corrective value can be newly computed in each new start phase and restart phase of the engine 1 in the manner described and be actualized in the permanent memory 35.

Furthermore, it can be provided that an additional correction of the fuel quantity, which is to be supplied to the engine 1, is carried out in the restart phase when the third corrective value exceeds a pregiven value or when the rough running in the restart phase exceeds a second pregiven value. In the first case, the air/fuel mixture, which is formed by the correction of the injection time with the weighted or unweighted corrective value, is enriched too much and operates negatively on the quality of the exhaust gas; in the other case, the air/fuel mixture is too lean and causes a rough running which is too great. This is so in both cases because the weighted or unweighted third corrective value was not determined in the actual start or restart phase but in a previous start or restart phase so that the conditions could have changed in the meantime and a fuel of another quality is present in the actual start or restart phase. This case can be considered by the described additional correction of the injection time computed in block 55 and therefore the air/fuel ratio which is to be formed or the fuel quantity which is to be supplied to the engine.

If, for example, the rough running exceeds its second pregiven value, which is greater than or equal to its first pregiven value, then the difference, of the instantaneous rough running value and this second pregiven value is used as an input for a PI controller (not shown). The injection time is corrected with the output of the PI controller. Accordingly, if the rough running becomes greater than its second pregiven value, then the injection time is increased until the rough running maintains at least its second pregiven value. In order to prevent an impermissibly high fuel enrichment of the air/fuel mixture by this function, it can be provided that an upper limit for the injection time, which is to be adjusted, is provided. This injection time is represented by the pregiven value for the third corrective value. Correspondingly, a lower limit for the fuel enrichment can also be provided in order to prevent that the air/fuel mixture becomes too lean and the rough running becomes thereby too great.

By connecting the information from the start and the restart phases to a common fuel quality characteristic value in the form of the third corrective value, subsequent functions in the start phase, the restart phase or the wall film compensation can be provided with suitable information as to the fuel quality. In this way, these functions can respond to changed fuel qualities and the fuel precontrol can thereby be significantly improved. The method is especially improved in the restart range because the fuel quality characteristic value is not only precontrolled based on information from the start phase but additionally based on information from the restart phase. From an uneven running of the engine in the restart phase, an index for a fuel quality, which deviates from the certified fuel, and the inadequate fuel metering which results therefrom for the engine 1 can be determined. The rough running is limited by a correction of the injection time.

It is understood that the foregoing description is that of the preferred embodiments of the invention and that various changes and modifications may be made thereto without departing from the spirit and scope of the invention as defined in the appended claims.

What is claimed is:

1. A method for correcting a fuel quantity, which is supplied to an internal combustion engine, the method comprising the steps of:

carrying out a correction in dependence upon a first corrective value for a start phase of said engine and in dependence upon a second corrective value for a restart phase of said engine;

determining said first corrective value in dependence upon the rpm run-up in said start phase; and, determining said second corrective value in dependence upon the rough running of said engine in said restart phase.

2. The method of claim 1, wherein the correction of said fuel quantity is carried out in at least one dynamic operating phase of said engine.

3. The method of claim 2, wherein said at least one dynamic operating phase is one of: the start phase, the restart phase and a wall film compensation.

4. The method of claim 2, wherein the correction of said fuel quantity is weighted differently in different ones of said dynamic operating phases.

5. A method for correcting a fuel quantity which is supplied to an internal combustion engine, the method comprising the steps of:

carrying out a correction in dependence upon a first corrective value for a start phase of said engine and in dependence upon a second corrective value for a restart phase of said engine;

determining a third corrective value from said first and second corrective values in order to correct the fuel quantity; and, causing said first and second corrective values to flow weighted into said third corrective value.

6. The method of claim 5, wherein said third corrective value is determined utilizing addition or multiplication.

7. The method of claim 5, wherein said third corrective value is determined for a first engine start temperature.

8. The method of claim 5, wherein said third corrective value is transferred weighted to at least a further engine start temperature.

9. A method for correcting a fuel quantity which is supplied to an internal combustion engine, the method comprising the steps of:

carrying out a correction in dependence upon a first corrective value for a start phase of said engine and in dependence upon a second corrective value for a restart phase of said engine; and, carrying out an additional correction of said fuel quantity in a restart phase when the correction of said fuel quantity exceeds a pregiven value or when the rough running in the restart phase exceeds a pregiven value.

10. A method for correcting a fuel quantity which is supplied to an internal combustion engine during a starting operation of said engine, the method comprising the step of:

carrying out a correction in dependence upon a first corrective value for a first dynamic operating phase of said starting operation of said engine and in dependence upon a second corrective value for a second dynamic operating phase of said starting operation of said engine.

11. The method of claim 10, comprising the further step of determining said first corrective value in dependence upon the rpm run-up in said first dynamic operating phase.

12. The method of claim 10, wherein the correction of said fuel quantity is carried out via a correction of the injection time.

13. An arrangement for correcting a fuel quantity which is supplied to an internal combustion engine during a starting operation of said engine, the arrangement comprising means for carrying out the correction in dependence upon a first corrective value for a first dynamic operating phase of said starting operation of said engine and in dependence upon a second corrective value for a second dynamic operating phase of said starting operation of said engine.

* * * * *